Sept. 2, 1969     R. C. HAMILTON     3,464,708
SEAL
Filed Aug. 27, 1965
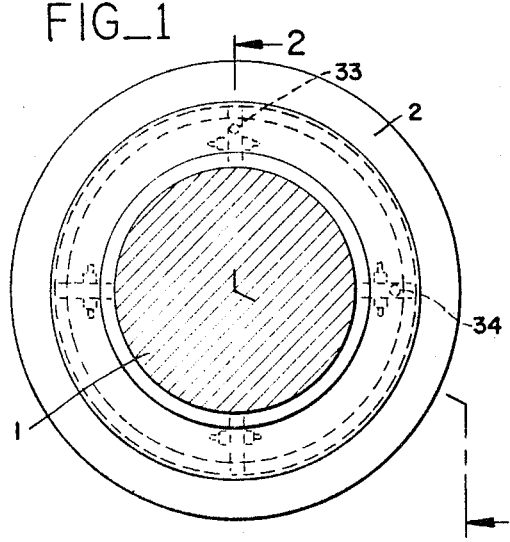
FIG_1
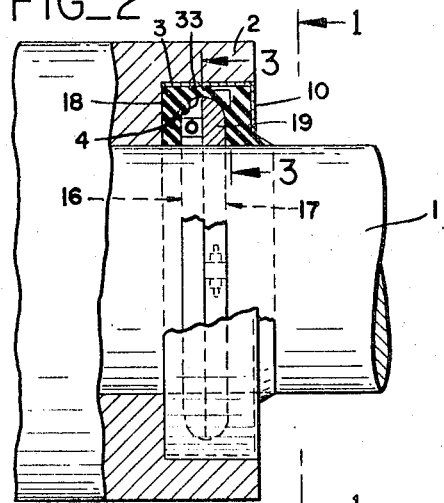
FIG_2
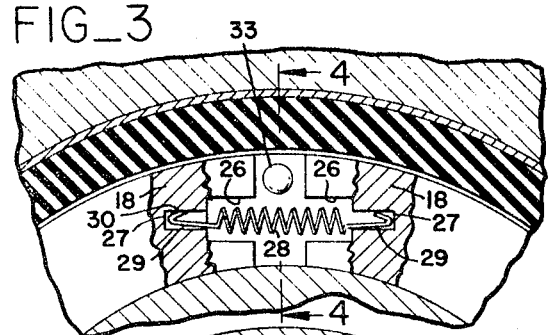
FIG_3
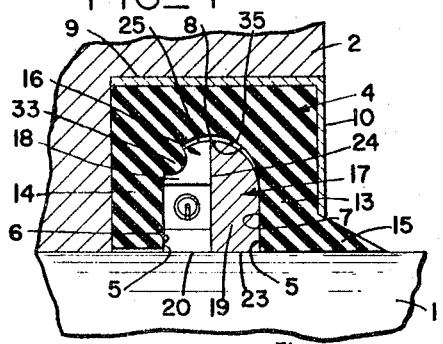
FIG_4
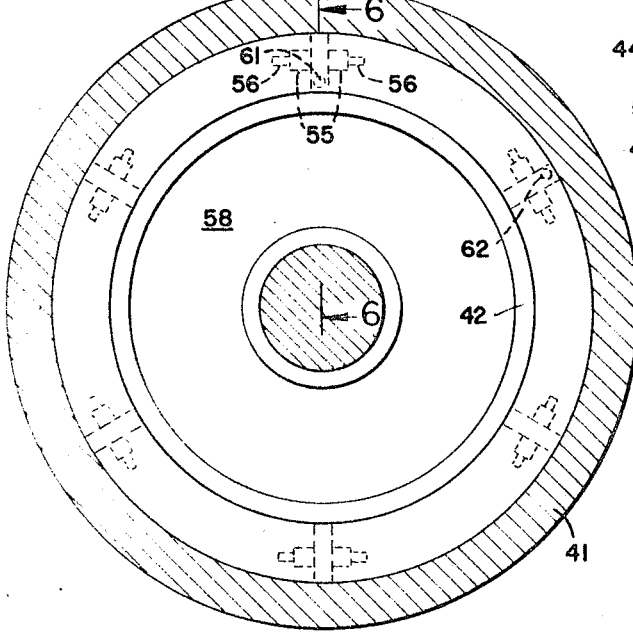
FIG_5
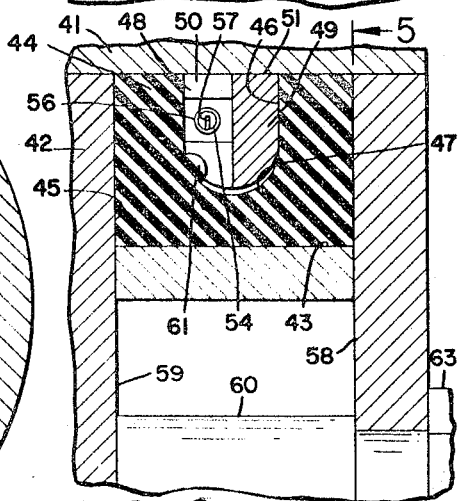
FIG_6
INVENTOR.
ROY C. HAMILTON
BY
*Boyden, Mohler & Foster*
ATTORNEYS

United States Patent Office 3,464,708
Patented Sept. 2, 1969

3,464,708
SEAL
Roy C. Hamilton, Santa Rosa, Calif., assignor to Rodpak Manufacturing Co., Reno, Nev., a corporation of Nevada
Filed Aug. 27, 1965, Ser. No. 483,114
Int. Cl. F16j 15/02
U.S. Cl. 277—151        2 Claims

ABSTRACT OF THE DISCLOSURE

An annular seal for positioning between complementary cylindrical surfaces such as in a bearing around a shaft or in a piston within a cylinder, that includes segments of a pair of coaxial rings in face-to-face engagement and coil springs extend circumferentially of and within said rings for yieldably holding the latter in sealing engagement with such shaft or cylinder. The segments of one ring of a pair are staggered relative to those of the other pair and the springs include means at their ends automatically engaging the adjacent end portions of adjacent segments of each ring against dislodgment.

---

This invention relates to sealing means for use on cylindrical rotary and reciprocating members, such as between shaft bearings and shafts, or between pistons and cylinders, and is an improvement over the invention disclosed in United States Letters Patent No. 2,459,642 issued to myself and Edward S. Rothchild, jointly.

One of the objects of the present invention is the provision of a seal that is adapted to withstand higher pressures than heretofore.

Another object of the invention is the provision of an improved seal of the type shown in the aforesaid patent that overcomes the likelihood of injury to the shaft or cylinder from one or more of the springs employed.

A still further object of the invention is the provision of a seal for use in a bearing for a shaft or the like that is of a structure to prevent objectionable injury to the seal due to objectionable variation in pressure on the seal that heretofore has occurred, at times, in using take-up glands to apply pressure.

An additional object of the invention is the provision of an improved seal that is more economical to make than heretofore, and in which the parts are more positively held together.

Heretofore, as seen in the above mentioned patent, metal sealing rings on the order of Babbitt's metal have been formed in three segments. A helical compression spring between segments is employed to urge the segments apart and under yieldable engagement with the inside walls of a cylinder in cases where the seal is carried on a piston or other cylindrical element within the cylinder. Expansion springs are used where the seal is carried by a bearing, and the segments engage the shaft to yieldably maintain the segments in engagement with the shaft. These springs should be held, at their ends, to the adjacent ends of the segments against any possibility of separation from the segments. No portion of any of the springs should under any circumstances engage the inside walls of a cylinder in which a piston or other element is reciprocable or the outer surface of a rotating shaft in a bearing. In structure heretofore employed the springs have, at times, become loosened or have been offset sufficiently to engage the cylinder walls or the outer surfaces of shafts, causing injury thereto, which possibility has been eliminated by this invention.

Also, heretofore the employment of three segments has been found necessary in the case of shafts and bearings to prevent leakage past the seal under a pressure up to 1500 lbs. per square inch, whereas in the present instance only two segments are required to maintain a seal against leakage therepast, under the same conditions, and under pressures of up to 2000 lbs. per square inch.

Also, heretofore, foreign material has, in some instances, been carried along a shaft to the seal, whereas in the present instance means has been provided for overcoming this likelihood.

Other objects and advantages will appear in the description and in the drawings.

FIG. 1 is an elevational view of a seal on a shaft and within a bearing, taken along line 1—1 of FIG. 2, the shaft being in cross section.

FIG. 2 is a part sectional, part elevational view at a right angle to FIG. 1, taken along line 2—2 of FIG. 1, the bearing and parts of the seal being broken away, with the latter being in cross section.

FIG. 3 is a greatly enlarged fragmentary sectional view taken along line 3—3 of FIG. 2.

FIG. 4 is an enlarged fragmentary sectional view taken substantially along line 4—4 of FIG. 3.

FIG. 5 is a sectional view taken at line 5—5 of FIG. 6 showing a piston having a seal thereon, the latter being slightly modified, but the sealing rings being of the same structure as in FIGS. 3, 4.

FIG. 6 is a greatly enlarged fragmentary sectional view taken substantially along line 6—6 of FIG. 5 but the piston rod being indicated in elevation.

In detail, a rotary shaft 1 is shown in FIG. 1 which shaft is rotatably supported in a bearing 2.

Bearing 2 is counterbored at one end as at 3 (FIG. 2) for receiving the seal assembly of this invention.

The seal assembly comprises an annular ring 4 of any suitable rubber-like material, such as the synthetic rubber known as "Buna" or "Hycar." Similar products are supplied under other trade names. The ring 4 is formed with a radially inwardly opening circumferentially extending annular recess or channel 5 (FIG. 4) having flat opposed, parallel side surfaces 6, 7 and a rounded concave bottom 8 in cross sectional contour, the curvature of which is preferably formed substantially about a common radius at any point around the ring.

A thin, cylindrical metal shell or band 9 encloses the ring 4, and said shell includes a radially inwardly directed flange 10 at one end, which flange extends over one of the axially outwardly facing surfaces of the ring.

Preferably the sidewall 13 of the channel 5 is thicker than the opposite sidewall 14 and the flange 10 extends over and in engagement with the outer surface of wall 13 to a point spaced from the inner periphery of the ring, and an axially outwardly projecting annular projection 15 extends axially outwardly of the ring around the inner periphery thereof, and which projection is in wiping engagement with shaft 1. This projection 15 extends past the free inner edge of flange 10 and shaft 1, and the radially outwardly facing surface of said projection preferably tapers toward the axis of the ring 4 to terminate in a more or less feather edge. The radially inwardly facing surfaces of the sides 13, 14 and projection 15 are cylindrical and are substantially in engagement with shaft 1, particularly the projection 15, since the latter is at all times in yieldable, wiping contact with the shaft 1 to prevent any foreign material outside the seal from passing along the shaft to channel 5.

Fitted within channel 5 are two sealing rings, generally designated 16, 17. These rings may be of any suitable material. Babbitt's metal, and modifications thereof, and the plastic material known to the trade as Teflon are examples.

Sealing ring 16 is formed by a pair of corresponding segments 18, while sealing ring 17 is identical to sealing ring 16 and is formed by a pair of segments 19.

Each of the segments 18 is of uniform cross sectional outer contour throughout its length, being rectangular along its radially inner portion to provide a relatively wide radially inwardly facing cylindrical surface 20 that is adapted to be in sealing engagement with the shaft 1.

Segments 19 are identical with segments 18 and have relatively wide radially inwardly facing cylindrical surfaces 23 (FIG. 4) that are in sealing engagement with shaft 1.

Segments 18, 19 of rings 16, 17 have adjoining flat engaging surfaces at right angles to surfaces 20, 23 that engage each other in a vertical plane 24 (FIG. 4) that is perpendicular to the axis of the ring 4. The radially outwardly facing surfaces of said segments 18, 19 are each approximately quarter-round in cross scetional contour, as at 25, and when the flat sides of the segments are together said quarter-round surfaces combine to form a substantially half-round surface that substantially follows the concave cross sectional curvature of the bottom of the channel 5. The circumferential curvature of the segments substantially follows the circumferential curvature of the channel 5.

The adjacent ends of segments 18 of ring 16, and segments 19 of ring 17 are formed with relatively large opposedly opening recesses 26 that are in axial alignment (FIG. 3) and the bottoms or inner ends of these recesses are formed with coaxial, smaller diameter cylindrical sided recesses or holes 27.

A helical expansion spring 28 extends between the adjacent ends of the pair of segments 18, and a corresponding spring 28 extends between the adjacent ends of segments 19. Springs 28 are substantially coaxial with each pair of opposedly opening recesses 26 and holes 27, and each spring has a straight axially outwardly projecting extension 29 thereof at each of the opposite ends thereof, and each such extension is formed adjacent to its outer end with a return bend to provide a reversely extending open hook 30.

Normally when the springs and their extensions are separate from the segments, the hook 30 projects rearwardly from the return bend at a relatively wide angle so that the hook must be sprung toward the extension 29 to enter a hole 27.

In connecting the segments 18, 19, the extensions 29 at opposite ends of each spring 28 are thrust into the opposedly opening holes 27 thus compressing the hooks 30 to a degree and when the latter are fully in the openings the relatively sharp free outer ends of the hooks 30 will be held in yieldable engagement with the walls of the holes, thus preventing withdrawal of the extensions 29 from the holes. The opposite end portions of the springs 28 may extend into the opposedly opening recesses 26.

The adjacent ends of the rings 16, 17 are spaced apart sufficiently to enable the segments thereof to be inserted into the channel 5 through the open side of the ring 4, and projections 33, 34 respectively formed on the inner opposite walls of the channel 5 are preferably spaced apart 90 degrees circumferentially of the ring 4. Projection 33 is positioned between one of the adjacent ends of the pair of segments 18 while projection 34 is between the adjacent ends of the segments 19, thereby holding the two pairs of segments against rotation relative to each other and to the ring 4 so there will be no open gap between the two sealing rings 16, 17.

The outer diameter of the band 9 or outer shell is very slightly greater than the inside diameter of the counterbore 3, and in installing the seal the ring 4, with the band or shell 9 secured thereon, and with the sealing rings 16, 17 within channel 5, is pressed into the counterbore with the flange 10 and the thick side 13 of the ring 4 in trailing position, and the outer surface of flange 10 will normally be substantially flush with the end surface of the bearing 2. Thus the annular extension 15 will be directed outwardly of the bearing 2. The springs 28 will be expanded when the segments 18, 19 embrace the shaft and said segments will be yieldably held against the shaft in sealing relation thereto and, as the seals wear, the springs 28 will automatically compensate for such wear.

Also, the radially inwardly facing surfaces 20, 23 of the rings 16, 17, including the radially inwardly facing surface of the extension 15, will be held against the shaft 1 due to the compression of the rings as the shell 9 is forced into the counterbore 3, and the difference between the circumferences of the shell and counterbore is such that the pressure of the ring 4 is such as to preclude injury to the ring. Where take-up glands have been used in the past for holding a seal in a bearing and against a shaft, the amount of pressure against the seal has usually been up to the operator, and many seals have been burned and injured due to too high a pressure being applied.

In operation, any oil or the like that may work its way into channel 5 from the axially outer side of the seal, or in any other manner, forms a pocket or space 35 between the concave and convex surfaces 8, 25 at the outer periphery of the sealing ring, where such oil creates a pressure on the segments 18, 19, forcing the segments more tightly against the shaft 1.

The enlarged recesses 26 at the adjacent ends of the pairs of segments enables bringing said ends closer together and also the inner side of each recess extends between the spring 28 and shaft 1 to prevent the spring from engaging the shaft. In providing a rectangular and relatively wide radially inner portion on each segment, the holes 27 may be spaced a substantially greater distance from the outer surface of shaft 1, thus eliminating any likelihood of the spring touching the shaft. Of course, the positive holding of the end extensions of each spring 28 in the holes 27, as described, prevents any loosening between the spring ends within holes 27.

FIGS. 5, 6 illustrate the sealing rings as applied to a piston, in which the structure and principle of operation is similar, but instead the segments have their flat cylindrical surfaces facing outwardly to engage the cylinder walls, and the springs that connect the segments are compression springs instead of expansion springs. Also, three pairs of segments are in each seal instead of two pairs, and no outer band or shell is used, nor is there an extension similar to extension 15.

In detail, the cylinder in which the piston is reciprocable is generally designated 41 and the piston 42. The piston is of reduced diameter at its outer end, as at 43, and annular ring 44, of the same material as ring 4, is fitted over the outer end of the piston and against the axially outwardly facing shoulder 45 of the piston.

The annular ring 44 is formed with an annular outwardly opening recess or channel 46 having parallel opposedly facing sides and a concavely rounded bottom 47, corresponding in cross sectional contour to that of the channel 5 is ring 4.

Three pairs of sealing rings are used in FIGS. 5, 6 instead of only two pairs, as described for FIGS. 1-4. In FIG. 6, one segment of each pair being indicated at 48, 49 in side by side engaging relation, their cylindrical outer surfaces 50, 51 being in contact with the cylindrical inner surfaces of the cylinder 41. Springs 54 that are identical with springs 28 extend between and connect the adjacent ends of the segments forming each sealing ring that is made up of three segments, and the adjacent ends of the adjacent segments of each ring are each formed with an enlarged recess 55 and an outwardly opening hole 56 for receiving an end of each spring in the enlarged recess with the extension and hook on each spring extending into hole 56 for securing the extension and hook 57 therein (FIG. 6).

The annular ring 47 may be held in place on the piston by a circular head 59 that is clamped against the cylinder head by any suitable means, such as by a nut 63 on the outer end of the piston rod 60, as shown in the patent hereinbefore noted.

The sidewalls of the channel 46 may be formed with a pair of projections 61, 62 respectively at opposite sides of the channel for extending between the adjacent ends of a pair of segments of each ring to hold each of the sealing rings formed by the segments against rotation relative to each other and the segments of one ring are circumferentially offset so that the adjacent ends of the segments of one ring will be midway between the ends of each segment of the other ring to thereby prevent the sealing rings from shifting to permit an open gap between the pair of sealing rings.

I claim:
1. A seal comprising:
   (a) an annular, one-piece ring of flexible, resilient, rubber-like material formed with a recess therein extending circumferentially therearound and opening outwardly of one of its radially facing sides providing an annular channel having opposed side walls and a bottom wall connecting said side walls at one of their edges, and an open side opposite said bottom wall,
   (b) said side walls and said bottom wall being imperforate with the opposedly facing surfaces of said side walls being flat and the inner surface of said bottom wall being concave in transverse cross-sectional contour and in continuation of said opposedly facing surfaces,
   (c) a pair of coaxial sealing rings of corresponding size and shape and of rigid bearing material, transversely divided into separate segments of equal length in end-to-end relation within said recess with the segments of each sealing ring having a radially facing cylindrical surface directed radially outwardly of the open side of said one-piece ring adapted to slidably engage the correspondingly curved surface of a member with which said cylindrical surface is adapted to form a seal,
   (d) the segments of the sealing rings of said pair having flat, axially facing, opposed surfaces in engagement with each other and the radially facing surfaces of the pair of segments opposite to said cylindrical surfaces being convex and complementary to the inner surface of said bottom wall of said one piece ring and substantially against the latter, and the oppositely laterally outwardly facing surfaces of said pair of sealing rings being flat and in engagement with the opposedly facing surfaces of the side walls of said recess in said continuous ring.
   (e) the adjacent ends of adjacent segments of each sealing ring being formed with opposedly opening, aligned recesses spaced between the radially inner and outer sides of said segments, and a coil spring between the said adjacent ends having an extension at each end extending into the recesses in said ends, each of said extensions being formed with a return bend at the outer end of each extension to provide a reversely directed hook member extending at a substantial angle to each extension, the outer end portion of each of said extensions including the hook member thereon being enclosed within one of said recesses in each segment with the terminating outer end of each hook member in yieldable engagement with a side of each recess to preclude withdrawal of each extension from the recess in which it is positioned, said hook members yieldably holding said cylindrical surfaces on said rings in sealing engagement with the correspondingly curved surface of such member with which said cylindrical surface is adpated to form a seal, said opposed side walls of said one-piece ring being continuous circumferentially thereof and extending to said cylindrical radially facing surfaces of said sealing rings for engagement with said curved surface of said member at opposite side of said pair of sealing rings.

2. A seal as defined in claim 1;
   (f) a cylindrical outer metal shell enclosing and in tight engagement with the radially outwardly facing surface of said bottom wall of said continuous ring and having a flange extending over and in tight engagement with the axially outwardly facing side of one of said side walls,
   (g) said flange terminating in a circular edge coaxial with and short of the radially facing edge of the side wall in engagement therewith, and said last-mentioned side wall being formed with an annular projection extending axially of said continuous ring across said circular edge and outwardly of said flange for engaging the said member with which the sealing rings and said side walls are adapted to form a seal, said projection tapering in a direction axially outwardly of said member to a relatively thin outer edge to obstruct movement of foreign material along such member to said recess and sealing rings.

References Cited

UNITED STATES PATENTS

| | | | |
|---|---|---|---|
| 1,912,793 | 6/1933 | Peterson | 277—151 |
| 2,073,888 | 3/1937 | Toward | 277—148 |
| 2,459,642 | 1/1949 | Hamilton et al. | 277—151 |
| 2,908,516 | 10/1959 | Stein | 277—137 |
| 3,275,331 | 9/1966 | Mastrobattista et al. | 277—152 |

FOREIGN PATENTS 78,312   1949   Czechoslovakia.

LAVERNE D. GEIGER, Primary Examiner

JEFFREY S. MEDNICKA, Assistant Examiner

U.S. Cl. X.R.

277—121, 137, 192, 235